United States Patent [19]
Galbraith

[11] 3,759,225
[45] Sept. 18, 1973

[54] BATCH OPERATED MILKING APPARATUS

[76] Inventor: Francis A. Galbraith, 3472 N. Haverhill Rd., West Palm Beach, Fla. 33401

[22] Filed: Aug. 29, 1972

[21] Appl. No.: 284,495

[52] U.S. Cl. .............................................. 119/14.04
[51] Int. Cl. ............................................... A01j 5/00
[58] Field of Search ...................... 119/14.03, 14.04

[56] References Cited
UNITED STATES PATENTS

| | | | |
|---|---|---|---|
| 3,709,196 | 1/1973 | Hicks | 119/14.04 |
| 2,617,382 | 11/1952 | Duncan | 119/14.03 |
| 3,460,515 | 8/1969 | Page et al. | 119/14.04 |
| 1,987,955 | 1/1935 | Hapgood | 119/14.04 |

Primary Examiner—Louis G. Mancene
Assistant Examiner—J. N. Eskovitz
Attorney—Leo A. Rosetta et al.

[57] ABSTRACT

A rotary platform is divided into sectors, each sector containing a plurality of milking stalls. Preparation enclosures each hold a plurality of cows equal in number to the number of stalls in each sector so that the cows are prepared for milking, placed on the rotating platform, milked and discharged from the platform in batches rather than in single sequence. Batches of cows are admitted to the platform alternately from the preparation enclosures.

10 Claims, 4 Drawing Figures

3,759,225

BATCH OPERATED MILKING APPARATUS

BACKGROUND OF THE INVENTION

This invention is in the field of milking apparatus wherein cows are placed on a travelling platform and milked by machines during travel of the platform.

Milking apparatus of the travelling platform type is known and it has been proposed to provide such travelling platforms in the form of annular platforms rotatable about a vertical axis. Such prior proposals are illustrated in U.S. Pat. Nos. 1,968,564 and 2,305,259. In the prior proposals, however, the animals were placed on the moving platform, one at a time and in sequence. It was necessary to prepare the cows for milking after they were placed on the platforms. Such prior devices, however, have proven uneconomical and impractical, for reasons that will appear as this description proceeds.

SUMMARY OF THE INVENTION

The present invention proposes a rotary platform type of milking apparatus with means facilitating the preparation and stimulation of the cows before they are placed on the platform and for placing them on and removing them from the rotating platform in batches of preferably at least four animals at a time. Preparation of each batch of animals takes place alternately in a pair of preparation enclosures. Thus, a single attendant may prepare all of the animals without having to perform such duties with the animals on a moving platform.

BRIEF DESCRIPTION OF A PREFERRED EMBODIMENT

Figure 3:
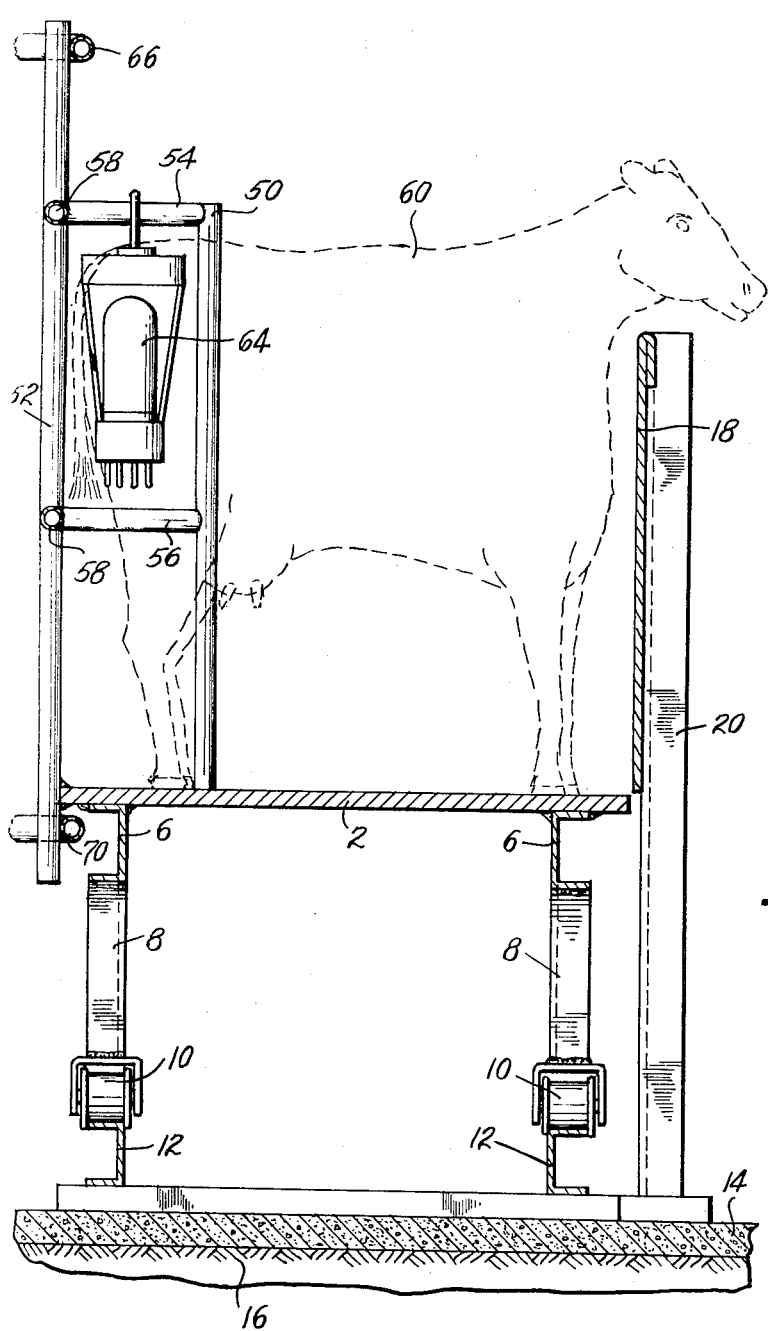
FIG. 3 is an enlarged sectional view taken along the line 3—3 of FIG. 1.

An annular platform 2 is supported for rotation about a central vertical axis 4 in the manner illustrated in FIG. 3. The platform 2 is provided with suitable frame members 6 secured thereto and from which legs 8 depend downwardly. The legs 8 rotatably support flanged guide rollers or wheels 10 at their lower ends. The rollers or wheels 10 ride on and are guided by concentric circular tracks 12, concentric to the axis 4 and supported on a suitable base 14 shown as resting on the ground 16. Preferably, the height of the platform 2 above the ground 16 is of the order of 32 inches.

An outer shroud or rail 18 extends upwardly from adjacent the outer periphery of the platform 2 and is supported by suitable posts or the like 20 in stationary relation to the ground 16. Thus, the rail or shroud 18 is stationary while the platform 2 rotates.

Figure 4:
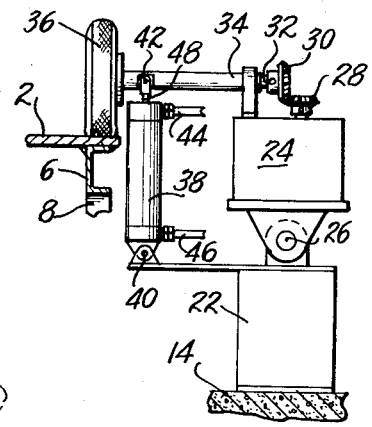
FIG. 4 is an enlarged sectional view taken along the line 4—4 of FIG. 1.

As shown in FIG. 4, a drive means is provided for rotating the platform 2. The drive means comprises a base 22 on which a motor and gear reduction means 24 is pivotally mounted about a horizontal pivot 26 extending generally tangent to the adjacent platform 2. The motor 24 includes an output gear 28 meshing with a bevel gear 30 on a shaft 32 journalled in a bearing structure 34 fixed to the casing of the motor 24 for pivotal movement therewith about pivot 26. The inner end of the shaft 32 has a wheel, for example the rubber-tired wheel 36 fixed thereto. As is apparent from FIG. 4, the rubber tire 36 frictionally engages the outer peripheral portion of the platform 2 over the frame 6 and legs 8 for driving the platform in rotation about axis 4. The base 22 also supports a pneumatic cylinder device 38, pivoted to the base 22 at 40 and also pivoted to the bearing structure 34 at 42. Suitable compressed air inlets and outlets 44 and 46 are provided. The pneumatic motor 38 is a conventional device having a cylinder with a piston therein having an extending piston rod 48 that is pivotally secured to the bearing structure 34. The cylinder is pivoted to the base 22 at 40. It will be obvious that when compressed air is admitted to conduit 44, the tire 36 will be pressed downwardly against the platform 2 to provide good driving contact therewith. Likewise, when the pressure is vented from conduit 44 and compressed air applied to conduit 44, the tire 36 is lifted from the platform 2 to thus serve as a clutch. Lifting of the wheel 36 swings the bearing 34 and motor 24 about pivot 26. Thus, the drive means may be selectively operated to impart rotational drive of the platform 2 or to disconnect drive therefrom, as desired. The drive means shown is merely by way of example. Any suitable drive arrangement may be used within the scope of the invention.

As shown, the rotary platform 2 is provided with upstanding stanchions or pillars 50 inwardly of its inner periphery, stanchions 52 at its inner periphery and horizontal members 54 and 56 joining those stanchions along with further horizontal members 58 joining a stanchion 50 to a peripherally spaced stanchion 52 to define a multiplicity of "herringbone" stalls on the platform 2. The arrangement of the stalls is most clearly shown in FIG. 1 and their purpose is to position cows 60 on the platform in the manner shown by dotted line in FIGS. 1 and 3. Dairy cows customarily milked by machine naturally enter and assume the positions illustrated in the stalls.

Figure 1:
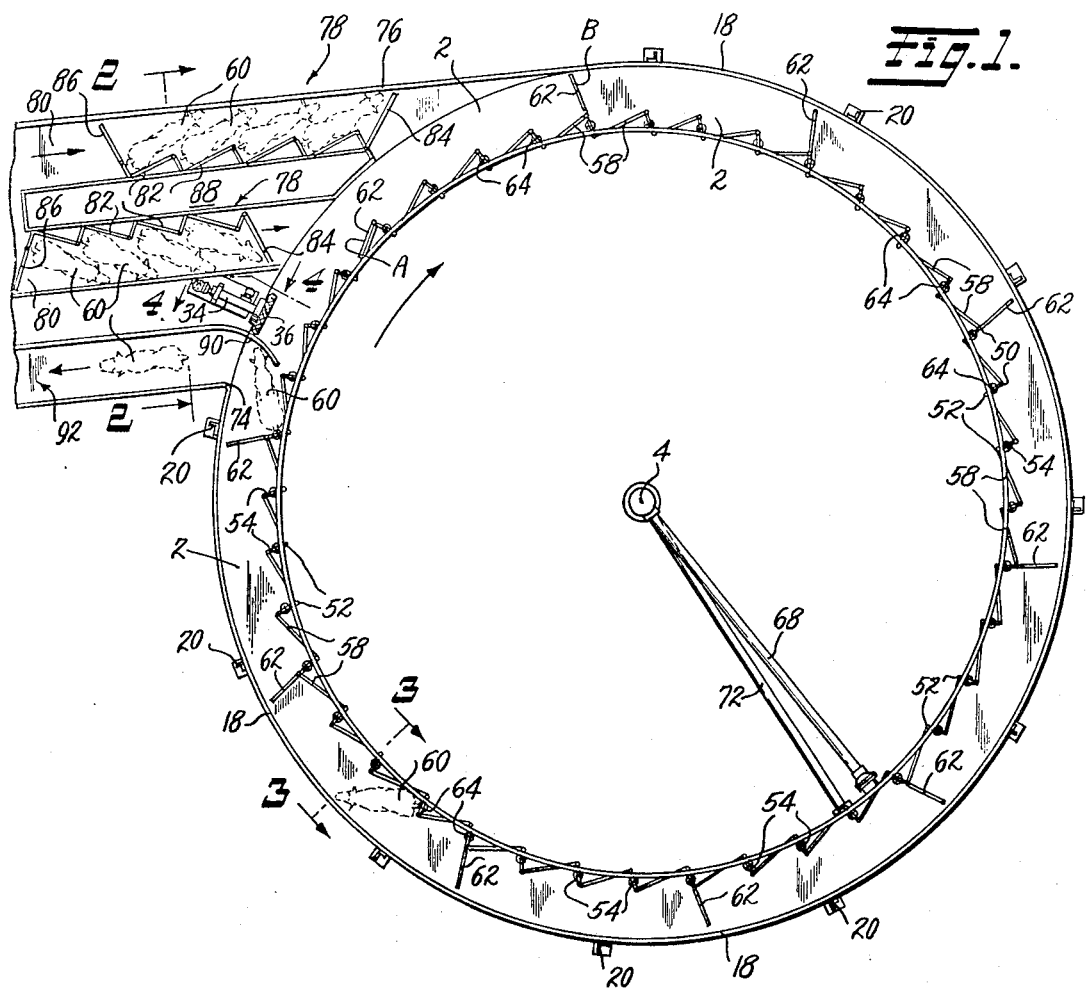
FIG. 1 is a schematic illustration, in plan view, of an apparatus embodying the present ivention.

As most clearly shown in FIG. 1, the platform 2 is provided with forty individual stalls. Such number, however, is merely illustrative and more or fewer stalls may be provided, although a greater number of stalls increases the size of the apparatus and, therefore, the cost thereof.

As shown, the platform 2 is further provided with a plurality of gates or barriers 62 extending from selected stanchions 50 outwardly over the platform 2 to divide the same into a number of sectors, each sector containing a plurality of the described stalls. In the example shown, the barriers 62 divide the platform into 10 sectors, each containing four stalls. It is to be understood, however, that a greater number of stalls may be included in each sector and it is to be further noted that the total number of stalls on the platform is a multiple of the integral number of stalls in each sector. It is contemplated that the barriers 62 be movable so as to permit changing the number of sectors on the platform and thereby the number of stalls in each sector.

A suitable conventional milking machine 64 is supported on each of the horizontal members 54 so that a milking machine is accessible for milking a cow in the adjacent stall. The stanchions 52 extend upwardly above the members 54 and they support a suitable suction line or pipe 66 having a radially extending portion 68 (FIG. 1) connected through any suitable or conventional rotary gland to a source of suction at the axis 4. Means (not shown) are provided for connecting the suction line 66 to each of the milking machines 64. Likewise, the stanchions 52 support a circular milk-conducting line or pipe 70 (see FIG. 3) having fixtures (not shown) adjacent each stall for the connection of the milk delivery conduit from the corresponding milking machine 64. The conduit 70 is provided with a radially extending portion 72, connected through any suitable rotary gland to a milk delivery or storage means (not shown) at or adjacent the axis 4. The suction line and milk delivery line may be considered to be more or less conventional in this type of apparatus.

Figure 2:
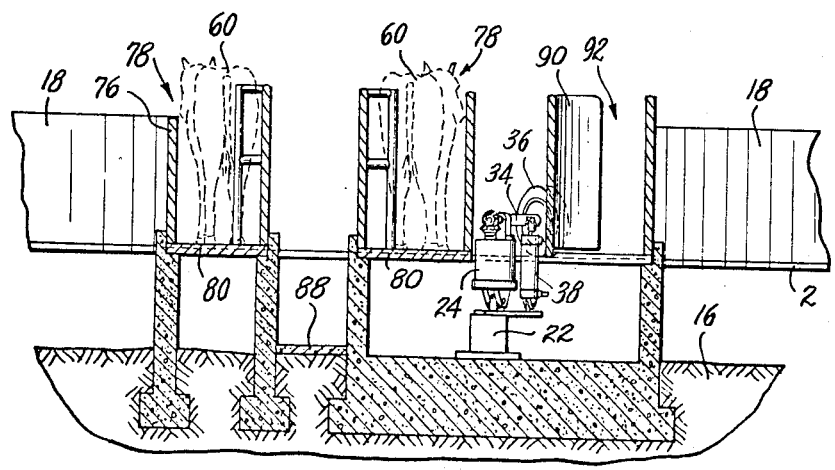
FIG. 2 is an enlarged sectional view taken along the line 2—2 of FIG. 1.

Referring now to FIGS. 1 and 2, it will be seen that the shroud 18 does not extend completely around the platform but terminates, at 74, at a discharge or egress station. The other end of the shroud extends tangentially from the platform 2 to define a rail or side portion 76 of a preparation enclosure to be described.

A pair of preparation enclosures 78 are provided in generally side-by-side and spaced relation, as shown in FIG. 1. Each of these enclosures is provided with a floor portion 80 substantially coplanar with the annular platform 2 and extending closely adjacent the outer periphery thereof. Suitable ramps (not shown) are provided for directing animals from collection pens into the respective enclosures 78. Each of the enclosures 78 is provided with means 82 defining stalls similar to those on the rotary platform for directing the cattle into the relative positions shown by dotted lines in FIG. 1. Each enclosure is provided with a movable exit gate 84 between the enclosure and the platform 2. Likewise, each enclosure is provided with a movable inlet gate 86. It will be obvious a gate 86 may be opened while corresponding gate 84 is closed and a batch (for example, four) of animals is admitted to the preparation enclosure whereupon gate 86 may be closed. While a both of animals is in a preparation enclosure, an attendant standing at ground level, on the base 88 (FIG. 2) is in position to efficiently prepare the four animals in an enclosure. Such preparation usually comprises cleansing or washing the animals and stimulating it prior to milking. After a batch of four animals has been prepared, the gate 84 is opened and the animals then walk onto the rotating platform 2 and assume their respective positions in the stalls of one sector which has been previously emptied. As the animals take their positions in the stalls, an attendant standing at ground level inside the platform 2 applies the milking machine cups to the four animals just admitted to that stall, all while the paltform continues rotating at relatively low speed. The speed of the platform is so regulated that a batch of cows is milked and stripped by the time the leading end of their sector reaches the end 74 of the shroud 18. A barrier or directing gate 90 may be provided in the position shown in FIG. 1 whereby cows in the sector reaching that position are directed outwardly off platform 2 and onto an exit ramp 92.

The barriers 62 and 90 may be in the form of cantilever bars at respectively different levels so that the barriers 62 may pass the barrier 90 without interference, as platform 2 rotates.

The preparation of a batch of cows in one of the enclosures and their movement onto the platform 2 has been described. It will be obvious that the provision of two preparation enclosures 78, as shown in FIG. 1, permits the discharge of a batch of cows from one enclosure onto the platform 2, the closing of its gate 84 and admitting another batch of cows thereto can be accomplished while the attendant is preparing the four cows previously admitted to the other preparation enclosure and thereby the second batch of cows will be ready for placement on the rotary platform as soon as the next sector reached the delivery end of the second enclosure. And the cycle may thus be repeated until all animals to be milked have been processed through the apparatus.

It has been found that the admission of animals to the platform in batches, as described, is a more efficient operation than that contemplated by the prior art since it permits operation of the entire apparatus by fewer personnel and at a relatively higher throughput rate.

The barriers 62 are preferably in the form of swinging gates so that, as each passes the barrier 90, suitable fixed means causes it to open to the position shown at A to avoid interference with the drive wheel 36. The gates 62 can be held open and then are closed, at about position B, after the next batch of cows has entered.

It is to be noted that the drive wheel 36 is positioned between exit ramp 92 and the first preparation enclosure 78 and in a region where it does not interfere with any cows on the platform or those leaving or entering stalls.

Optionally a feed trough may be provided on the apparatus.

While a single specific embodiment of the invention has been shown and described, the same is merely illustrative of the principles involved and other forms may be resorted to within the scope of the appended claims.

I claim:

1. In a milking apparatus having a rotary annular platform provided with a multiplicity of animal stalls obliquely arranged in annular array thereon, means for rotating said platform, means for milking animals in said stalls as said platform rotates, and stationary means adjacent said platform providing ingress and egress for animals to and from said platfrom and stalls, the improvement comprising:
   said stalls being adjacent the inner periphery and spaced from the outer periphery of said platform to define an animal walkway between said stalls and said outer periphery;
   the number of stalls on said platform being a multiple of a selected integral number greater than one; and
   animal barrier means on said platform, extending across said walkways, and dividing said platform into a plurality of sectors, each sector containing said selected integral number of stalls, whereby animals are placed on said platform and removed therefrom in batches each batch containing said integral number of animals.

2. A milking apparatus as defined in claim 1 wherein said selected integral number is four.

3. A milking apparatus as defined in claim 1 wherein said selected integral number is from four to eight.

4. A milking apparatus as defined in claim 1 wherein said means providing ingress comprises:
   means defining a preparation enclosure arranged to confine said selected integral number of animals in position to be prepared for milking; movable exit gate means between said enclosure and said adjacent platform for providing access to an adjacent sector of said platform from said enclosure; and movable entrance gate means for admitting said selected integral number of animals to said enclosure.

5. A milking apparatus as defined in claim 4 including a pair of said prepration enclosures adjacent but spaced from each other, the exit gate means of both said enclosures providing for access to a sector of said platform, whereby batches of animals may be sequentially transferred from alternate enclosures to said platform.

6. A milking apparatus as defined in claim 5 wherein said platform and said enclosures are elevated above ground level, whereby a person standing at ground level between said enclosures has easy access to animals in said enclosures for preparing them for milking.

7. A milking apparatus as defined in claim 4 wherein said means providing egress from said platform includes stationary barrier means extending over said platform and positioned to direct animals off said platform prior to reaching said means providing ingress.

8. A milking apparatus as defined in claim 1 wherein said stalls are open on their outer sides and arranged so that animals therein face obliquely outwardly toward said animal walkway, said means for milking being adjacent the inner periphery of said platform.

9. A milking apparatus as defined in claim 1 wherein said means for rotating said platform comprises a power-driven resiliently-tired wheel frictionally engaging the upper surface of said platform.

10. A milking apparatus as defined in claim 9 including selectively operable means for pressing said wheel downwardly against said platform and for lifting the same upwardly therefrom.

* * * * *